(12) United States Patent
Zhao et al.

(10) Patent No.: US 11,989,560 B2
(45) Date of Patent: May 21, 2024

(54) METHOD AND DEVICE FOR EXECUTING INSTRUCTIONS TO PERFORM ARTIFICIAL INTELLIGENCE

(71) Applicant: BEIJING HORIZON ROBOTICS TECHNOLOGY RESEARCH AND DEVELOPMENT CO., LTD., Beijing (CN)

(72) Inventors: Yitong Zhao, Beijing (CN); Xing Wei, Beijing (CN)

(73) Assignee: BEIJING HORIZON ROBOTICS TECHNOLOGY RESEARCH AND DEVELOPMENT CO., LTD., Beijing (CN)

( * ) Notice: Subject to any disclaimer, the term of this patent is extended or adjusted under 35 U.S.C. 154(b) by 107 days.

(21) Appl. No.: 17/224,473

(22) Filed: Apr. 7, 2021

(65) Prior Publication Data
US 2021/0318879 A1   Oct. 14, 2021

(30) Foreign Application Priority Data
Apr. 8, 2020 (CN) .......................... 202010271369.1

(51) Int. Cl.
*G06F 9/38* (2018.01)
*G06F 9/32* (2018.01)
*G06N 3/063* (2023.01)

(52) U.S. Cl.
CPC .............. *G06F 9/3836* (2013.01); *G06F 9/32* (2013.01); *G06N 3/063* (2013.01)

(58) Field of Classification Search
CPC .................. G06F 9/3836; G06F 9/32
See application file for complete search history.

(56) References Cited

U.S. PATENT DOCUMENTS

2003/0061467 A1* 3/2003 Yeh ........................ G06F 9/3857
  712/217
2010/0268920 A1* 10/2010 Brooks .................. G06F 9/3001
  712/222

(Continued)

FOREIGN PATENT DOCUMENTS

CN   1180199 A   4/1998
CN   101114218 A   1/2008
(Continued)

OTHER PUBLICATIONS

International Search Report of Chinese application No. 2020102713691 dated Apr. 24, 2022, 3 pages.
(Continued)

*Primary Examiner* — Michael J Metzger
(74) *Attorney, Agent, or Firm* — Brooks Kushman P.C.

(57) ABSTRACT

The present disclosure provides an instruction execution method, device, and electronic equipment. In the instruction execution method described above, after obtaining an exceptional signal generated by a neural network processor during an operation, the electronic equipment determines an exception processing instruction corresponding to the exceptional signal according to the exceptional signal, then it determines a first instruction queue needed to be executed by the neural network processor, and then it generates a second instruction queue based on the exception processing instruction and the first instruction queue, and finally it controls the neural network processor to execute the second instruction queue, so that errors encountered by the neural network processor can be timely processed, thereby shortening the error processing delay and improving the data processing efficiency of the hardware system in the electronic equipment.

15 Claims, 7 Drawing Sheets

(56) References Cited

U.S. PATENT DOCUMENTS

| | | | |
|---|---|---|---|
| 2012/0110307 A1* | 5/2012 | Tsuji | G06F 9/30156 |
| | | | 712/210 |
| 2016/0246604 A1 | 8/2016 | Winrow et al. | |
| 2019/0155678 A1 | 5/2019 | Hsiong et al. | |
| 2019/0324888 A1 | 10/2019 | Evans et al. | |
| 2019/0361767 A1* | 11/2019 | Karthik | G06F 11/0781 |
| 2019/0370439 A1* | 12/2019 | Lin | G06F 21/78 |
| 2020/0082273 A1 | 3/2020 | Rossi et al. | |
| 2020/0167221 A1* | 5/2020 | Vembu | G06F 11/0775 |
| 2020/0409757 A1* | 12/2020 | McBride | G06N 3/063 |
| 2020/0410036 A1* | 12/2020 | Huynh | G06F 15/8046 |

FOREIGN PATENT DOCUMENTS

| | | |
|---|---|---|
| CN | 105830036 A | 8/2016 |
| CN | 107671887 A | 2/2018 |
| CN | 109272109 A | 1/2019 |
| CN | 110825440 A | 2/2020 |

OTHER PUBLICATIONS

Mei, Working Principle of Interrupt & Exception Mechanism, CSDN, Apr. 30, 2018. 4 pages.

Sun et al., Approach on runtime monitoring based on the embedded trusted platforms, Chinese Journal of Network and Information Security, vol. 3, No. 10, Oct. 2017, pp. 00209-1 to 00209-8.

Supplementary Search Report of Chinese application No. 2020102713691 dated Nov. 18, 2022, 3 pages.

\* cited by examiner

METHOD AND DEVICE FOR EXECUTING INSTRUCTIONS TO PERFORM ARTIFICIAL INTELLIGENCE

CROSS-REFERENCE TO RELATED APPLICATIONS

This application claims priority to Chinese Application Serial No. CN 202010271369.1 filed Apr. 8, 2020, the disclosure of which is incorporated in its entirety by reference herein.

TECHNICAL FIELD

The present disclosure relates to the field of artificial intelligence technology, and in particular to an instruction execution method, an instruction execution device, and an electronic equipment for it.

BACKGROUND

With the continuous development of artificial intelligence technology and the continuous improvement of neural network models, more and more products use neural network models as mathematical models for data processing.

The neural network hardware system is a hardware platform used to implement the neural network models, and it comprises a neural network processor. During the operation of the neural network hardware system, the neural network processor needs to continuously process a large amount of data, and requires high accuracy. Once the hardware module in the neural network processor is exceptional (or abnormal), it needs to be processed immediately to return to normal.

SUMMARY

In the related prior art, the neural network processor uses an interrupt mechanism to perform exception processing, which takes too much time and lowers down the data processing efficiency of the entire neural network hardware system.

In order to solve the above technical problem, the present disclosure is proposed.

In an embodiment of the first aspect of the present disclosure, there is provided an instruction execution method including acquiring an exceptional signal generated by a neural network processor during an operation; according to the exceptional signal, determining an exception processing instruction corresponding to the exceptional signal; determining a first instruction queue to be executed by the neural network processor; generating a second instruction queue according to the exception processing instruction and the first instruction queue; executing the second instruction queue.

In the above instruction execution method, after acquiring the exceptional signal generated by the neural network processor during an operation, the electronic equipment, according to the exceptional signal, determines the exception processing instruction corresponding to the exceptional signal, then it determines the first instruction needed to be executed by the neural network processor, according to the exception processing instruction and the first instruction queue, and then it generates the second instruction queue, and finally controls the neural network processor to execute the second instruction queue, so that the errors encountered by the neural network processor can be processed timely, thereby shortening the error processing delay and improving the data processing efficiency of the neural network hardware system in the electronic equipment.

In an embodiment of the second aspect of the present disclosure, there is provided an instruction execution device including an acquisition module for acquiring an exceptional signal generated by a neural network processor during an operation; a determination module for determining an exception processing instruction corresponding to the exceptional signal according to the exceptional signal acquired by the acquisition module; and determining a first instruction queue needed to be executed by the neural network processor; a generation module for generating a second instruction queue according to the exception processing instruction and the first instruction queue; and an execution module for executing the second instruction queue generated by the generation module.

In an embodiment of the third aspect of the present disclosure, there is provided an electronic equipment including a processor; a memory for storing instructions being executable by the processor; wherein the processor is configured to read the executable instructions from the memory and execute the instructions to implement the instruction execution method provided in the first aspect.

It should be understood that the second to third aspects of the present application are consistent with the technical solutions of the first aspect of the present application, and the beneficial effects achieved by each aspect and corresponding feasible implementations are similar with each other, and these will not be repeated.

In an embodiment of the fourth aspect of the present disclosure, there is provided a computer-readable storage medium storing a computer program for executing the instruction execution method provided in the first aspect.

BRIEF DESCRIPTION OF THE DRAWINGS

Through a more detailed description of embodiments of the present disclosure in conjunction with the accompanying drawings, the above and other objectives, features, and advantages of the present disclosure will become more apparent. The accompanying drawings are used to provide a further understanding of the embodiments of the present disclosure, and constitute a part of the specification. Together with the embodiments of the present disclosure, they are used to explain the present disclosure, but do not constitute a limitation to the present disclosure. In the drawings, like reference numerals generally represent like components or steps.

FIG. 1 (a) is a structural schematic diagram of an electronic equipment provided by an exemplary embodiment of the present disclosure;

DETAILED DESCRIPTION

Hereinafter, exemplary embodiments according to the present disclosure will be described in detail with reference to the accompanying drawings. Obviously, the described embodiments are only a part of the embodiments of the present disclosure, rather than all the embodiments of the present disclosure, and it should be understood that the present disclosure is not limited by the exemplary embodiments described herein.

In the related prior art, a neural network processor uses an interrupt mechanism to perform exception processing, which takes too much time and lowers down the data processing efficiency of the entire neural network hardware system.

In the present disclosure, there is proposed an instruction execution method, which detects various types of errors often encountered by a neural network processor through various types of error detectors inside the neural network processor, then an exception processing instruction is inserted in a first instruction queue needed to be executed by the neural network processor, changing the execution order of the original instruction queue, and the errors encountered by the neural network processor are processed by executing the exception processing instruction, so that the errors occurred in the neural network processor can be timely processed, thereby shortening the error processing delay and improving the data processing efficiency of the neural network hardware system in the electronic equipment.

Figure 1A:
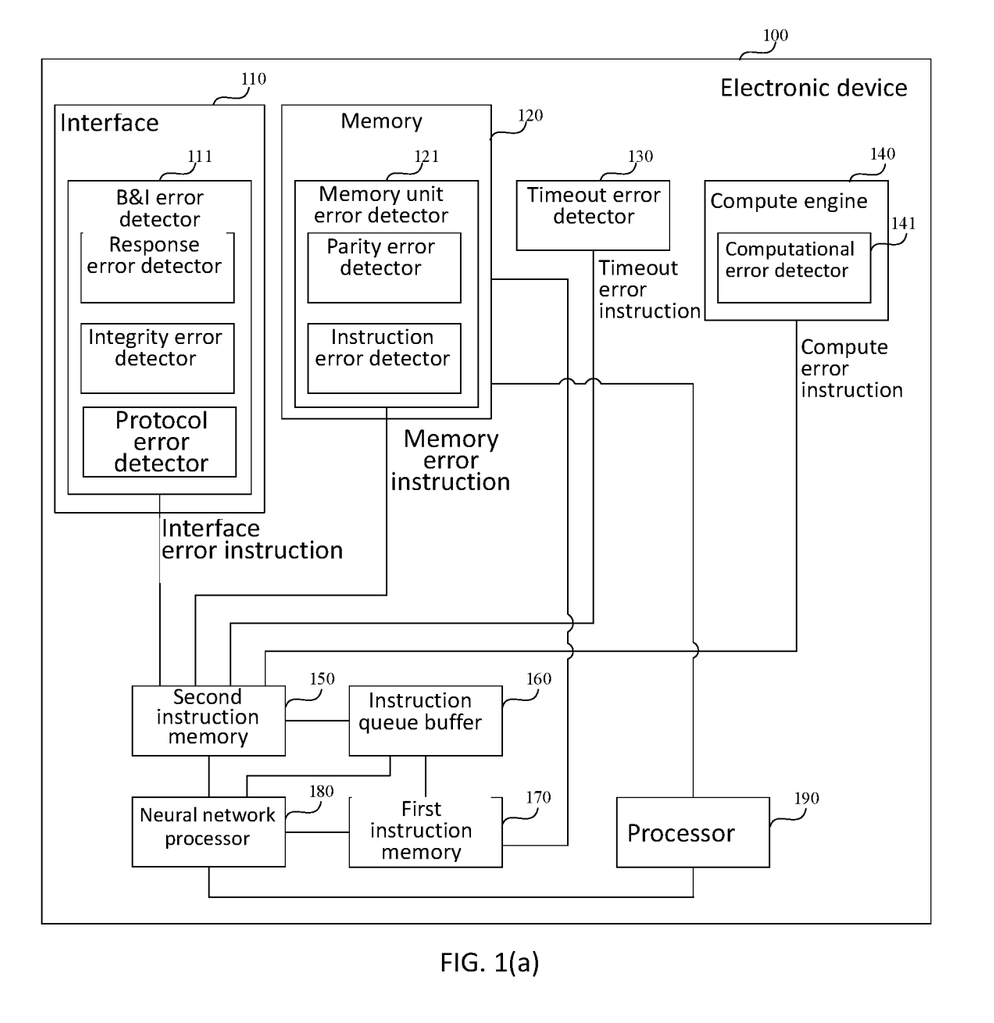

FIG. 1(*a*) is a structural schematic diagram of an electronic equipment provided by an exemplary embodiment of the present disclosure. As can be seen from FIG. 1(*a*), in the present disclosure, an electronic equipment 100 may comprise: 4 types of error detectors, i.e., a bus and interface error detector 111, a storage unit error detector 121, a timeout error detector 130, and a calculation error detector 141; wherein, the bus and interface error detector 111 is used to detect errors in the bus and interface, such as response errors, integrity errors, and/or protocol errors; the storage unit error detector 121 is used for error checking and correction (Error Correcting Code; hereinafter referred to as: ECC) of a Random Access Memory (hereinafter referred to as RAM), a First Input First Output (hereinafter referred to as FIFO), and/or a register file; the timeout error detector 130 is used to detect timeout errors; and the calculation error detector 141 is used to detect errors regarding such as multiplication and/or addition.

In addition, the electronic equipment 100 may further comprise a neural network processor 180, which can obtain errors detected by the above-mentioned error detectors.

Specifically, the electronic equipment 100 may be a smart electronic equipment such as a smart phone, a tablet computer, a personal computer (PC), or a vehicle-mounted smart device and the like. The specific form of the electronic equipment 100 is not limited in this embodiment.

In the present disclosure, the electronic equipment 100 generates an exceptional signal according to an error detected by the error detectors, during an operation, then according to the exceptional signal, the electronic equipment 100 determines an exception processing instruction corresponding to the exceptional signal, and acquires a first instruction queue needed to be executed by the electronic equipment 100 from the instruction queue buffer 160 in the electronic equipment 100, and then according to the exception processing instruction, the electronic equipment 100 determines processing priority corresponding to the exception processing instruction, and finally the electronic equipment 100 inserts the exception processing instruction into the first instruction queue according to the processing priority to generate a second instruction queue, and executes the second instruction queue, so that errors encountered by the electronic equipment 100 can be processed timely, shortening the error processing delay of the electronic equipment 100, and improving the data processing efficiency of the hardware system in the electronic equipment 100.

Figure 1B:
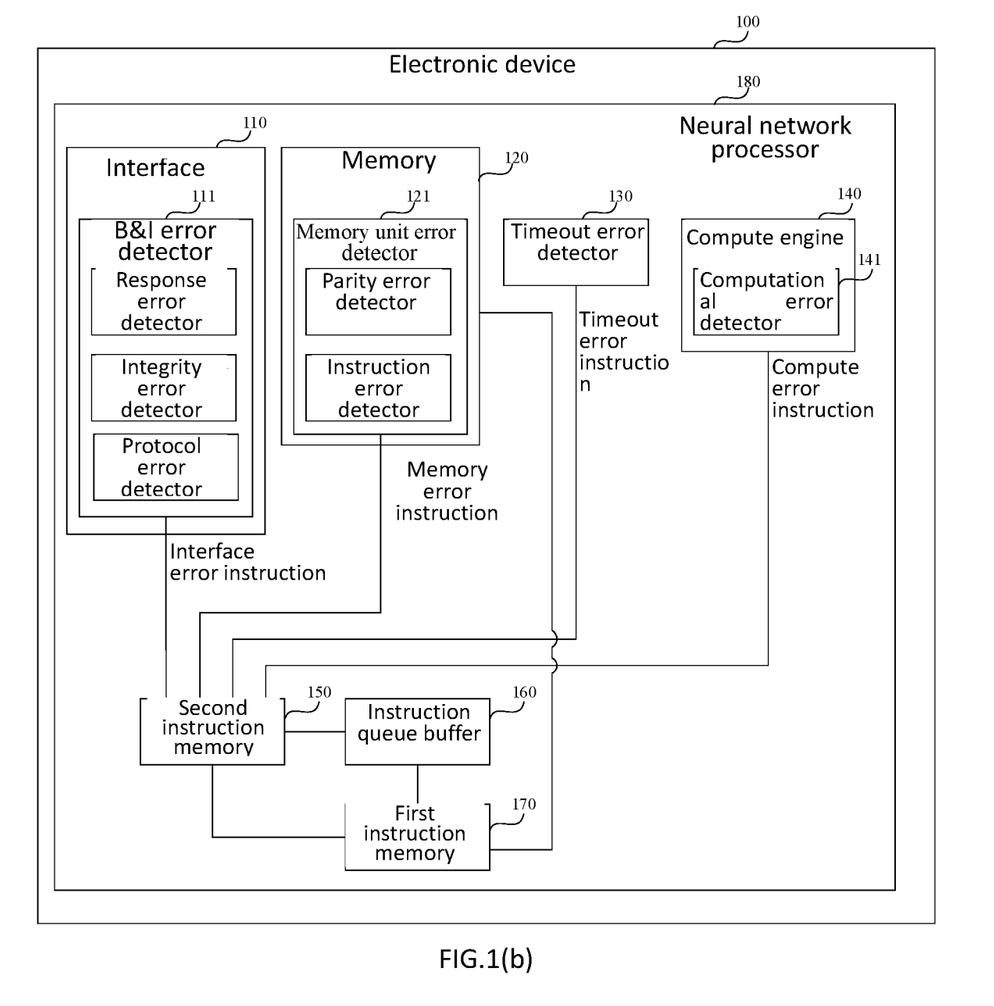
FIG. 1(b) is a structural schematic diagram of an electronic equipment provided by another exemplary embodiment of the present disclosure.

FIG. 1(*b*) is a structural schematic diagram of an electronic equipment provided by another exemplary embodiment of the present disclosure. As can be seen from FIG. 1(*b*), the electronic equipment 100 may comprise a neural network processor 180, which may comprise 4 types of error detectors, namely the bus and interface error detector 111, the storage unit error detector 121, the timeout error detector 130, and the calculation error detector 141; that is, in this embodiment, the neural network processor 180 is a System On a Chip (hereinafter referred to as SOC).

Figure 2:
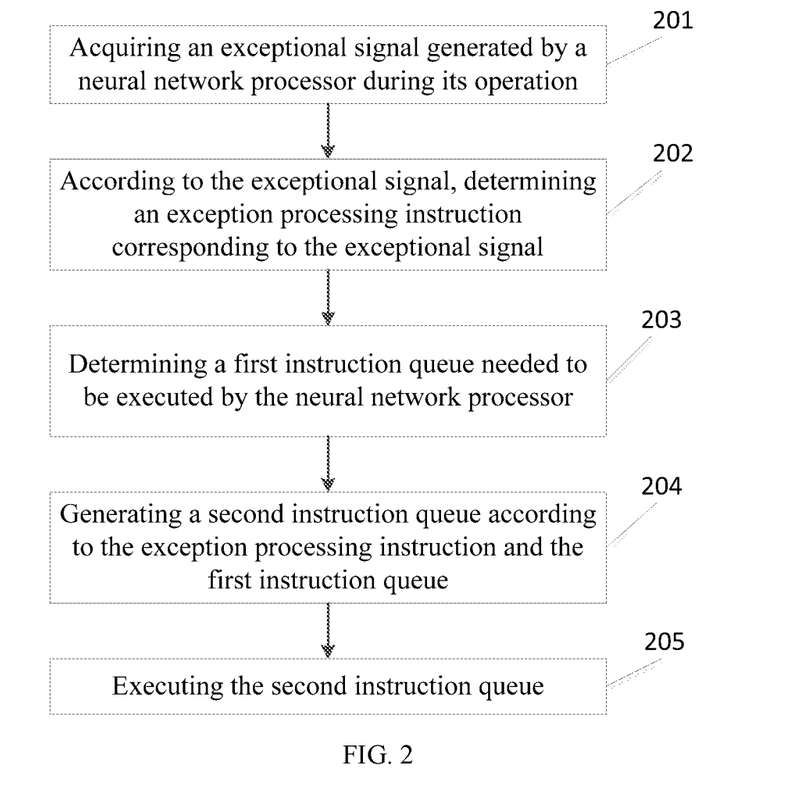
FIG. 2 is a schematic flowchart of an instruction execution method provided by an exemplary embodiment of the present disclosure.

FIG. 2 is a schematic flowchart of an instruction execution method provided by an exemplary embodiment of the present disclosure. This embodiment can be applied to the electronic equipment 100. Referring to FIG. 1(*a*) to FIG. 1(*b*), the electronic equipment 100 comprises the neural network processor 180.

As shown in FIG. 2, the method may include Step 201: acquiring an exceptional signal generated by a neural network processor during an operation.

The exceptional signal is generated by the electronic equipment 100 based on various errors detected by the error detectors in FIG. 1 (*a*)~FIG. 1 (*b*). Various errors detected by the error detectors may comprise: (a) a bus and interface error detected by the bus and interface error detector 111, such as a response error, an integrity error, and/or a protocol error, etc.; (b) a RAM and/or FIFO error detected by the storage unit error detector 121; (c) a timeout error detected by the timeout error detector 130; and (d) a multiplication and/or addition error detected by the calculation error detector 141.

The above-mentioned errors are only a few examples of errors detected by the error detectors in the electronic equipment 100. Of course, other errors may also occur during the operation of the electronic equipment 100, which is not limited in this embodiment.

Step 202: according to the exceptional signal, determining an exception processing instruction corresponding to the exceptional signal.

Specifically, the exception processing instruction is used to process the exceptional signal generated by the neural network processor 180 during an operation. For example, assuming that the exceptional signal is generated based on the bus and interface error detected by the bus and interface error detector 111, then the exception processing instruction corresponding to the exceptional signal may be an instruction to close the interface; and assuming that the exceptional signal is generated based on an error resulted from such as multiplication and/or addition detected by the calculation error detector 141, the exception processing instruction corresponding to the exceptional signal may be an instruction to shut down the computing unit in which the error occurred, and/or an instruction to adjust the mapping relationship of the computing unit.

Step 203: determining a first instruction queue needed to be executed by the neural network processor.

The first instruction queue comprises a plurality of instructions that need to be executed during the operation of the neural network processor 180 when no exceptional signal is detected.

Step 204: generating a second instruction queue according to the exception processing instruction and the first instruction queue.

Specifically, after detecting the exceptional signal and determining the exception processing instruction corresponding to the exceptional signal, the electronic equipment 100 may insert the exception processing instruction into the first instruction queue to generate a second instruction queue.

For example, assuming that the first instruction queue comprises the following instructions: N0, N1, N2, ..., Nn, and the neural network processor 180 sequentially executes the instructions N0, N1, N2, ..., Nm in the first instruction queue, and assuming that when the neural network processor 180 executes the Nm instruction, the bus and interface error detector 111 detects that the neural network processor 180 encounters a bus and interface error, and the electronic equipment 100 generates an exceptional signal based on the error detected by the bus and interface error detector 111, and determine that an exception processing instruction corresponding to the exceptional signal is an instruction Ama to close the interface, then the electronic equipment 100 generates a second instruction queue according to the instruction Ama to close the interface and the first instruction queue, wherein the second instruction queue is N0, N1, N2, ..., Nm, Ama, Return, No, Np, ..., Nn.

Step 205: executing the second instruction queue.

In the above instruction execution method, after acquiring the exceptional signal generated by the neural network processor during its operation, the electronic equipment 100 determines the exception processing instruction corresponding to the exceptional signal according to the exceptional signal, and then it determines the first instruction queue required to be executed by the neural network processor, and generates the second instruction queue according to the exception processing instruction and the first instruction queue, and finally it controls the neural network processor to execute the second instruction queue, so that errors encountered by the neural network processor can be processed in time, thereby shortening the error processing delay, and improving the data processing efficiency of the neural network hardware system in the electronic equipment 100.

Figure 3:
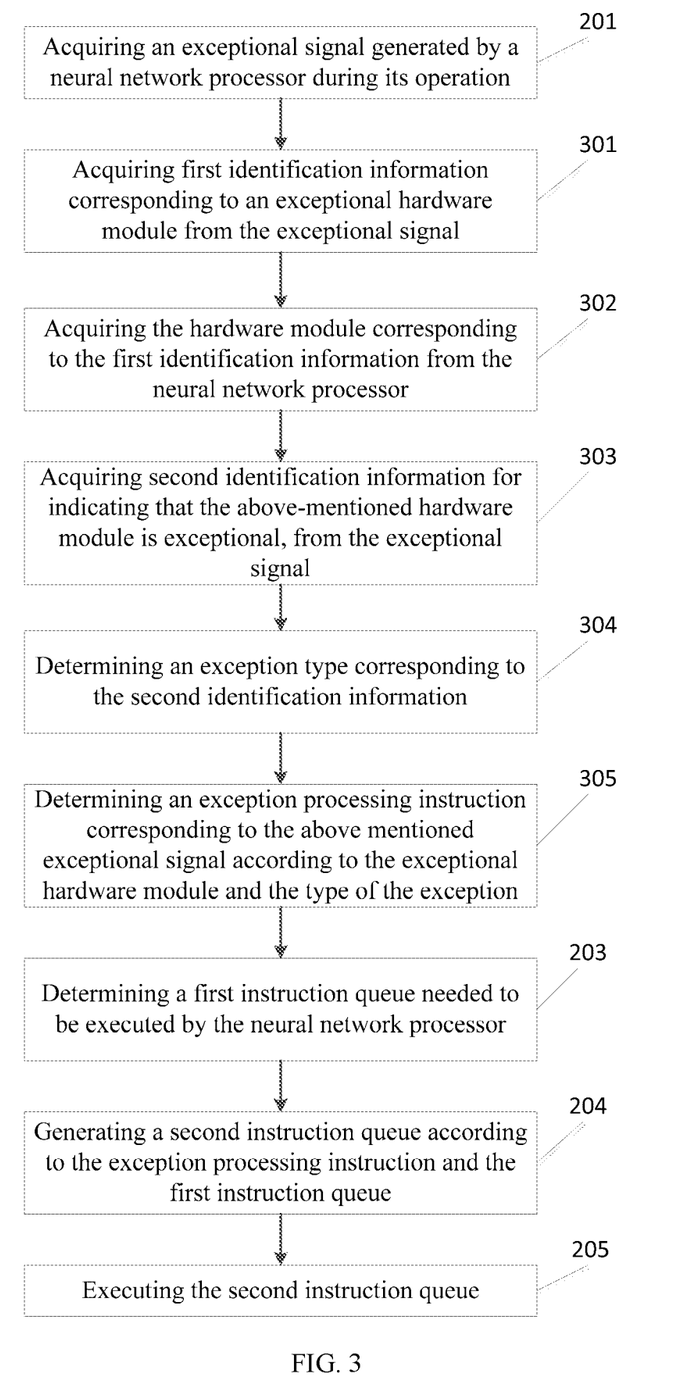
FIG. 3 is a schematic flowchart of an instruction execution method provided by another exemplary embodiment of the present disclosure.

FIG. 3 is a schematic flowchart of an instruction execution method provided by another exemplary embodiment of the present disclosure. This embodiment can be applied to the electronic equipment 100. Referring to FIG. 1(a) to FIG. 1(b), the electronic equipment 100 comprises the neural network processor 180.

As shown in FIG. 3, the embodiment of the present disclosure may include Step 301: acquiring first identification information corresponding to an exceptional hardware module from the exceptional signal.

The first identification information may be a mark of the exceptional hardware module, which is used to indicate the exceptional hardware module.

Step 302: acquiring the hardware module corresponding to the first identification information from the neural network processor.

Specifically, since the first identification information may be the mark of the exceptional hardware module, the electronic equipment 100 can obtain the hardware module corresponding to the first identification information from the hardware modules comprised in the electronic equipment 100 itself according to the first identification information.

Step 303: acquiring second identification information for indicating that the above-mentioned hardware module is exceptional, from the exceptional signal.

Step 304: determining an exception type corresponding to the second identification information.

Specifically, the second identification information is used to identify the type of exception that occurs in the hardware module. For example, the above-mentioned exception type may be a response error, an integrity error, a timeout error, or a multiplication error.

Step 305: determining an exception processing instruction corresponding to the above mentioned exceptional signal according to the exceptional hardware module and the type of the exception.

For example, assuming that the electronic equipment 100 determines that the exceptional hardware module is an interface module according to the first identification information, the type of exception that occurs in the interface module, for example, a response error, can be determined according to the second identification information. In this way, according to the exceptional hardware module (interface module) and the exception type (response error), it is determined that the exception processing instruction corresponding to the above mentioned exceptional signal can be an instruction to close the interface.

In this embodiment, the electronic equipment 100 may obtain the exceptional hardware module in the neural network processor according to the first identification information obtained from the exceptional signal, and may also obtain the type of the exception occurring in the hardware module according to the second identification information obtained from the exceptional signal, and then the exception processing instruction corresponding to the exceptional signal can be determined according to the exceptional hardware module and the exception type, so that the exceptional hardware module in the neural network processor and the type of the exception occurring in the hardware module can be accurately obtained, then the exception occurring in the hardware module can be processed in time, thereby shortening the error processing delay, and improving the data processing efficiency of the hardware system in the electronic equipment 100.

Figure 4:
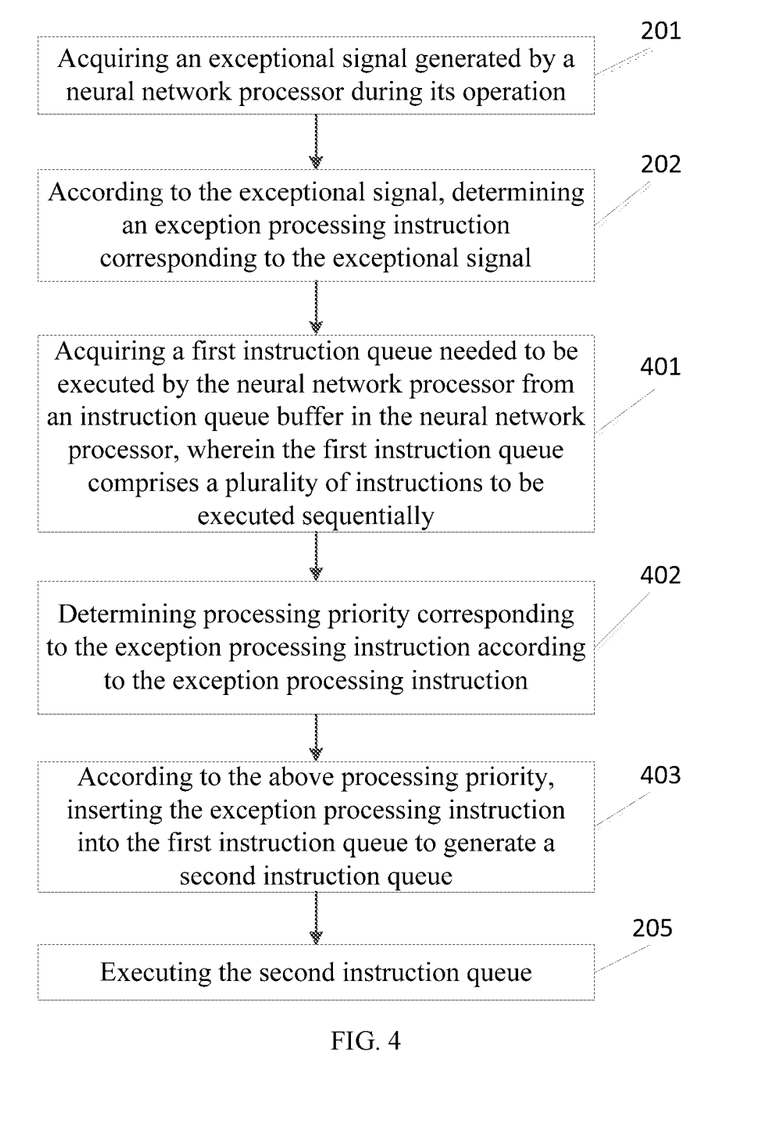
FIG. 4 is a schematic flowchart of an instruction execution method provided by still another exemplary embodiment of the present disclosure.

FIG. 4 is a schematic flowchart of an instruction execution method provided by still another exemplary embodiment of the present disclosure. This embodiment can be applied to the electronic equipment 100. Referring to FIG. 1(a) to FIG. 1(b), the electronic equipment 100 comprises the neural network processor 180.

As shown in FIG. 4, the embodiment of the present disclosure may include Step 401: acquiring a first instruction queue needed to be executed by the neural network processor from an instruction queue buffer in the neural network processor, wherein the first instruction queue comprises a plurality of instructions to be executed sequentially.

Referring to FIG. 1(a)-FIG. 1(b), the first instruction queue can be stored in the instruction queue buffer 160, and the neural network processor 180 can acquire a plurality of instructions needed to be executed from the instruction queue buffer 160 when executing the first instruction queue.

Step 402: determining processing priority corresponding to the exception processing instruction according to the exception processing instruction.

In specific implementation, the processing priority of the exception processing instruction corresponding to the exceptional signal can be set according to the influence degree of the exceptional signal on the processing performance of the electronic equipment 100, so as to ensure that errors that have a greater impact on the processing performance of the electronic equipment 100 can be processed preferably.

Step 403: inserting, according to the above processing priority, the exception processing instruction into the first instruction queue to generate a second instruction queue.

In a specific implementation, in order to ensure the processing performance of the electronic equipment 100, the processing priority of the exception processing instruction corresponding to the exceptional signal may be set according to the influence degree of the exceptional signal on the processing performance of the electronic equipment 100. Specifically, the processing priority of the exception processing instruction corresponding to the exceptional signal that has a greater impact on the processing performance of the electronic equipment 100 needs to be set higher, so that errors that have a greater impact on the processing performance of the electronic equipment 100 can be processed preferentially. For example, assuming that the priority of the instruction to close the interface is higher than the priority of the instruction to shut down the computing unit where the error occurred, then the instruction to close the interface needs to be ranked before the instruction to shut down the computing unit where errors occurred, when the exception processing instructions are inserted into the first instruction queue. Of course, when inserting the exception processing instruction into the first instruction queue, the ranking of the processing priority of the exception processing instruction and the instruction in the first instruction queue also needs to be taken into account. According to the processing priority, the exception processing instruction is inserted into the first instruction queue.

In this embodiment, the processing priority of the exception processing instruction corresponding to the exceptional signal can be set according to the influence degree of the exceptional signal on the processing performance of the electronic equipment 100, thereby ensuring that errors that have a greater impact on the processing performance of the electronic equipment 100 can be processed preferably, and ensuring the normal operation of the electronic equipment 100, which in turn can improve the data processing efficiency of the hardware system in the electronic equipment 100.

Figure 5:
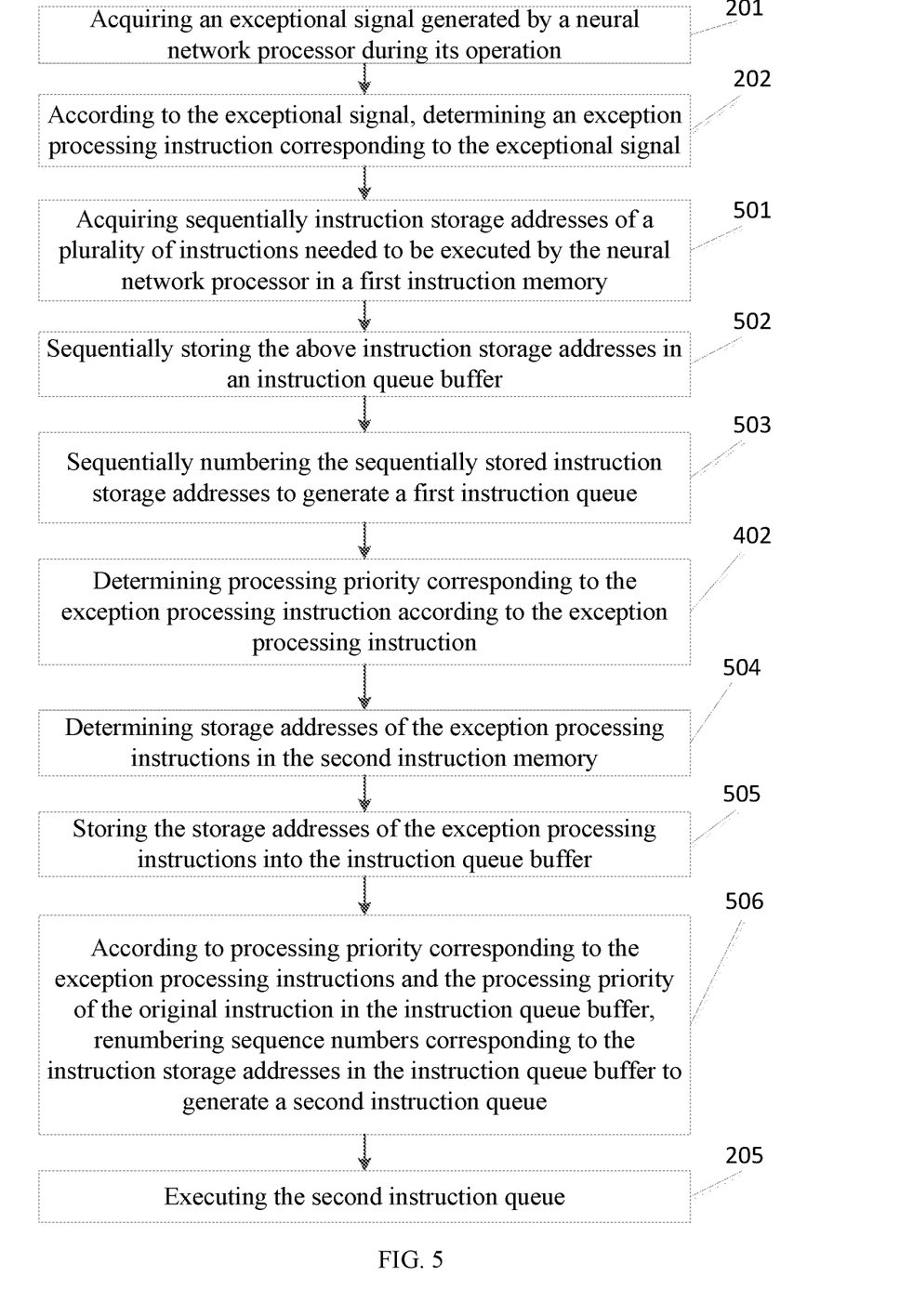
FIG. 5 is a schematic flowchart of an instruction execution method provided by still another exemplary embodiment of the present disclosure.

FIG. 5 is a schematic flowchart of an instruction execution method provided by still another exemplary embodiment of the present disclosure. This embodiment can be applied to the electronic equipment 100. Referring to FIG. 1(a) to FIG. 1(b), the electronic equipment 100 comprises the neural network processor 180. As shown in FIG. 5, in the embodiment of the present disclosure, the neural network processor may further comprise a first instruction memory, and the foregoing instruction execution method may include:

Step 501: acquiring sequentially instruction storage addresses of a plurality of instructions needed to be executed by the neural network processor in a first instruction memory.

Step 502: sequentially storing the above instruction storage addresses in an instruction queue buffer.

The instruction queue buffer may be a storage unit circuit used to store instruction storage addresses, such as a First Input First Output (FIFO) memory.

Step 503, sequentially numbering the sequentially stored instruction storage addresses to generate a first instruction queue.

For example, assuming that the instruction storage addresses of the plurality of instructions that the neural network processor needs to execute in the first instruction memory are $D_0, D_1, D_2, \ldots, D_n$, and $D_0, D_1, D_2, \ldots, D_n$ are sequentially stored in the instruction queue buffer, and then $D_0, D_1, D_2, \ldots, D_n$ are sequentially numbered as $N_0, N_1, N_2, \ldots, N_n$ in turn, according to the precedence of storing in the instruction queue buffer. In this way, the first instruction queue is $N_0, N_1, N_2, \ldots, N_n$.

Further, the neural network processor further comprises a second instruction memory, and a plurality of exception processing instructions are stored in the second instruction memory; in this way, step 403 may include:

Step 504: determining storage addresses of the exception processing instructions in the second instruction memory.

Step 505, storing the storage addresses of the exception processing instructions into the instruction queue buffer.

Step 506, according to processing priority corresponding to the exception processing instructions and the processing priority of the original instruction in the instruction queue buffer, renumbering sequence numbers corresponding to the instruction storage addresses in the instruction queue buffer to generate a second instruction queue.

In this embodiment, after storing the storage address of the exception processing instruction in the instruction queue buffer 160, according to the processing priority corresponding to the exception processing instruction and the processing priority of the original instruction in the instruction queue buffer 160, the instruction storage addresses in the instruction queue buffer 160 are ordered, and then the sequence numbers corresponding to the instruction storage addresses in the instruction queue buffer are renumbered according to the result of the reordering, so that the execution order of the original instructions in the instruction queue buffer 160 can be changed, and the errors encountered by the neural network processor 180 could be processed timely, timely eliminating the already produced impact of the errors on the neural network processor 180, and restoring the normal operation of the neural network processor 180.

Figure 6:
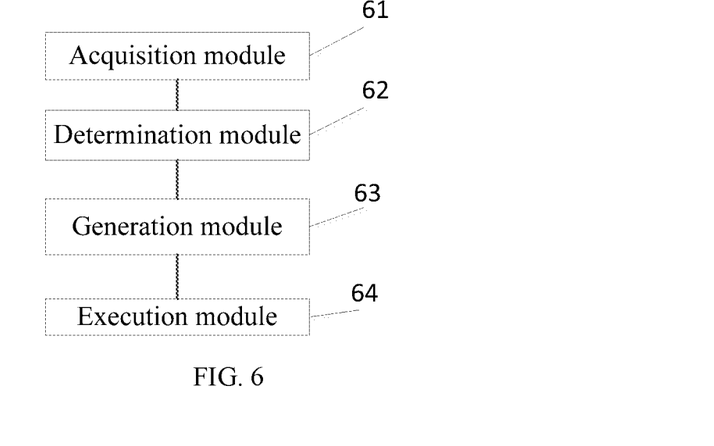
FIG. 6 is a structural schematic diagram of an instruction execution device provided by an exemplary embodiment of the present disclosure.

FIG. 6 is a structural schematic diagram of an instruction execution device provided by an exemplary embodiment of the present disclosure. The instruction execution device may be arranged in an electronic equipment. The instruction execution device may comprise: an acquisition module 61, a determination module 62, a generation module 63, and an execution module 64; wherein the acquisition module 61 is used to acquire exceptional signals generated by a neural network processor during an operation; the determination module 62 is used to determine an exception processing instruction corresponding to the exceptional signal according to the exceptional signal obtained by the acquisition module 61; and determine a first instruction queue needed to be executed by the neural network processor; the generation module 63 is used to generate a second instruction queue according to the exception processing instruction and the first instruction queue; and the execution module 64 is used to execute the second instruction queue generated by the generation module 63.

It should be understood that the instruction execution device shown in FIG. 6 may correspond to the electronic equipment 100 shown in FIG. 1. The functions of the acquisition module 61, the determination module 62, the generation module 63, and the execution module 64 can be implemented by the neural network processor 180 in the electronic equipment 100 shown in FIG. 1.

The instruction execution device provided by the embodiment shown in FIG. 6 can be used to execute the technical solution of the method embodiment shown in FIG. 2 of the present disclosure. For its implementation principles and technical effects, further reference may be made to related descriptions in the method embodiment.

Figure 7:
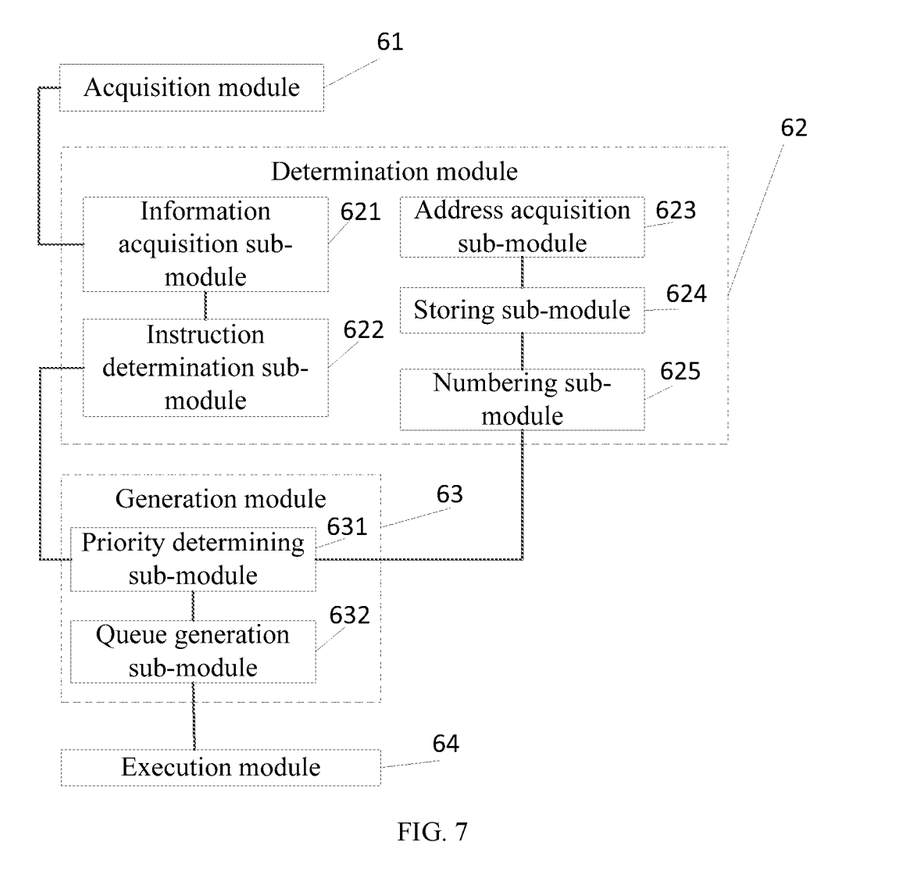
FIG. 7 is a structural schematic diagram of an instruction execution device provided by another exemplary embodiment of the present disclosure.

FIG. 7 is a structural schematic diagram of an instruction execution device provided by another exemplary embodiment of the present disclosure. Compared with the instruction execution device shown in FIG. 6, the difference is that in the instruction execution device shown in FIG. 7, the determination module 62 may comprise: an information acquisition sub-module 621 and an instruction determination sub-module 622; wherein the information acquisition sub-module 621 is used to obtain first identification information corresponding to an exceptional hardware module from the exceptional signal; and obtain the hardware module corresponding to the first identification information from the above neural network processor; and obtain second identification information used to indicate that the hardware module is exceptional, from the exceptional signal; and the instruction determination sub-module 622 is used to determine an exception type corresponding to the second identification information; and according to the exceptional hardware module and the above mentioned exception type, determine an exception processing instruction corresponding to the exceptional signal.

In this embodiment, the determination module 62 is specifically used to obtain the first instruction queue needed to be executed by the neural network processor from an instruction queue buffer in the neural network processor; wherein the first instruction queue comprises a plurality of instructions that are executed sequentially.

In this embodiment, the generation module 63 may include a priority determining sub-module 631 and a queue generation sub-module 632; wherein the priority determining sub-module 631 is used to determine the processing priority corresponding to the exception processing instruction according to the exception processing instruction; and the queue generation sub-module 632 is used to insert the exception processing instruction into the first instruction queue according to the above mentioned processing priority, to generate a second instruction queue.

The neural network processor further includes a first instruction memory, and the determination module 62 may comprise: an address acquisition sub-module 623, a storing sub-module 624, and a numbering sub-module 625; wherein the address acquisition sub-module 623 is used to sequentially obtain the instruction storage addresses of the plurality of instructions that the neural network processor needs to execute, in the first instruction memory; the storing sub-module 624 is used to sequentially store the instruction storage addresses into the instruction queue buffer; the numbering sub-module 625 is used to sequentially number the instruction storage addresses sequentially stored in the storing sub-module 624, to generate the first instruction queue.

The aforementioned neural network processor further includes a second instruction memory storing a plurality of exception processing instructions; the queue generation sub-module 632 is specifically used to determine a storage address of the exception processing instruction, in the second instruction memory; store the storage address of the exception processing instruction in the instruction queue buffer; and renumber the sequence number corresponding to the instruction storage address in the instruction queue buffer to generate a second instruction queue, according to the processing priority corresponding to the exception processing instructions and the processing priority of the original instruction in the instruction queue buffer.

It should be understood that the instruction execution device shown in FIG. 7 may correspond to the electronic equipment 100 shown in FIG. 1. The functions of the acquisition module 61, the determination module 62, the generation module 63, and the execution module 64, as well as the sub-modules comprised in the determination module 62 and the generation module 63 can be achieved by the neural network processor 180 in the electronic equipment 100 shown in FIG. 1.

The instruction execution device provided in the embodiment shown in FIG. 7 can be used to execute the technical solutions of the method embodiments shown in FIGS. 2 to 5 of the present disclosure. For details of the implementation principles and technical effects, further reference could be made to the related descriptions in the method embodiments.

Hereinafter, an electronic equipment provided according to an embodiment of the present disclosure will be described with reference to FIGS. 1(*a*) to 1(*b*). As shown in FIG. 1(*a*) to FIG. 1(*b*), the electronic equipment 100 may comprise a processor and a memory 120 for storing instructions executable by the processor.

The processor is used to read the foregoing executable instructions from the memory 120 and execute the instructions to implement the instruction execution method provided by the method embodiments shown in FIGS. 2 to 5 of the present disclosure. In one embodiment, the processor may be a neural network processor, such as the neural network processor 180 in FIG. 1(*b*); in another embodiment, the processor may also be a central processor other than the neural network processor, such as the processor 190 in FIG. 1(*a*), at this time, the neural network processor functions as a co-processor of the central processing unit to complete the auxiliary neural network calculation function.

Specifically, the processor may be a central processing unit (CPU) or another form of processing unit with data processing capability and/or instruction execution capability, and may control other components in the electronic equipment 100 to perform desired functions.

The memory 120 may comprise one or more computer program products, which may comprise various forms of computer-readable storage media, such as a volatile memory and/or a non-volatile memory. The volatile memory may comprise a random access memory (RAM) and/or a cache memory (cache), for example. The non-volatile memory may comprise, for example, a read-only memory (ROM), a hard disk, a flash memory, and the like. One or more computer program instructions may be stored on the computer-readable storage medium, and the processor may run the program instructions to implement the instruction execution methods of the various embodiments of the present disclosure described above and/or other desired functions. Various contents such as input signals, signal components, noise components, etc. can also be stored in the computer-readable storage medium.

In an example, the electronic equipment 100 may further comprise: an interface 110 and a calculation engine 140, which are interconnected by a bus system and/or other forms of connection mechanisms (not shown).

In addition, in an example, the electronic equipment 100 may further comprise: a first instruction memory 170, a second instruction memory 150, and an instruction queue buffer 160.

In addition, in the present disclosure, the electronic equipment 100 comprises 4 types of error detectors, namely a bus and interface error detector 111, a storage unit error detector 121, a timeout error detector 130, and a calculation error detector 141; wherein the bus and interface error detector 111 is used to detect errors in the bus and interface, such as response errors, integrity errors, and/or protocol errors; the storage unit error detector 121 is used for RAM, FIFO and/or ECC of register file; the timeout error detector 130 is used to detect timeout errors; and the calculation error detector 141 is used to detect errors regarding such as multiplication and/or addition.

In the present disclosure, after acquiring the error detected by the error detectors, the processor in the electronic equipment 100 may generate an exceptional signal according to the error, then according to the exceptional signal, may determine the exception processing instruction corresponding to the exceptional signal, and then obtain the first instruction queue that the electronic equipment 100 needs to execute, from the instruction queue buffer 160. The processor determines the processing priority corresponding to the exception processing instruction according to the exception processing instruction, and finally inserts the exception processing instruction into the first instruction queue according to the processing priority, to generate the second instruction queue, and the processor controls the neural network processor 180 to execute the second instruction queue, so that errors encountered by the electronic equipment 100 can be processed in time, which shortens the error processing delay and improves the data processing efficiency of the hardware system in the electronic equipment 100.

In addition to the above methods and apparatuses, the embodiments of the present disclosure may also be computer program products comprising computer program instructions that, when run by a processor, cause the processor to execute the steps of the instruction execution method shown in FIGS. 2 to 5.

The computer program product may use any combination of one or more programming languages to write program codes for performing the operations of the embodiments of the present disclosure. The programming languages can be object-oriented programming languages, such as Java, C++, etc., also can be conventional procedural programming languages, such as "C" language or similar programming languages. The program code can be executed entirely on the user's computing device, partly on the user's device, executed as an independent software package, partly on the user's computing device and partly executed on the remote computing device, or entirely on the remote computing device or server Executed on.

In addition, the embodiments of the present disclosure may also be a computer readable storage medium, on which computer program instructions are stored. When the computer program instructions are executed by a processor, the processor executes the steps in the instruction execution method shown in FIGS. 2 to 5.

The computer readable storage medium may be any combination of one or more readable media. The readable medium may be a readable signal medium or a readable storage medium. The readable storage medium may comprise, but is not limited to, an electrical, magnetic, optical, electromagnetic, infrared, or semiconductor system, apparatus, or device, or a combination of any of the above, for example. More specific examples (non-exhaustive list) of readable storage media comprise: electrical connections with one or more wires, portable disks, hard disks, random access memory (RAM), read only memory (ROM), erasable type programmable read only memory (EPROM or flash memory), optical fiber, portable compact disk read only memory (CD-ROM), optical storage device, magnetic storage device, or any suitable combination of the above.

The above describes the basic principles of the present disclosure in conjunction with specific embodiments. However, it should be pointed out that the advantages, improvements, effects, etc. mentioned in the present disclosure are only examples and not limitations, and these advantages, improvements, effects, etc. are not necessary for each embodiment of the present disclosure. In addition, the specific details of the foregoing disclosure are only for exemplary functions and ease of understanding, rather than limitations, and the foregoing details do not limit that the present disclosure has to be carried out by the foregoing specific details.

The block diagrams of the machines, devices, equipment, and systems involved in the present disclosure are merely illustrative examples and are not intended to require or imply that they must be connected, arranged, and configured in the manner shown in the block diagrams. As will be recognized by those skilled in the art, these machines, devices, equipment, and systems can be connected, arranged, and configured in any manner. Terms such as "comprise", "comprise", "have", etc. are open vocabulary and mean "comprising but not limited to" and can be used interchangeably with it. The terms "or" and "and" as used herein refer to the term "and/or" and can be used interchangeably with it, unless the context clearly indicates otherwise. The term "such as" used herein refers to the phrase "such as but not limited to" and can be used interchangeably with it.

It should also be pointed out that in the device, equipment and method of the present disclosure, each component or each step can be decomposed and/or recombined. These decomposition and/or recombination should be regarded as equivalent solutions of the present disclosure.

The above description of the disclosed aspects is provided to enable any person skilled in the art to fulfillment or take use of the present disclosure. Various modifications to these aspects are very obvious to those skilled in the art, and the general principles defined herein can be applied to other aspects without departing from the scope of the present disclosure. Therefore, the present disclosure is not intended to be limited to the aspects shown herein, but claims rights in accordance with the widest scope consistent with the principles and novel features disclosed herein.

The above description has been given for the purposes of illustration and description. In addition, this description is not intended to limit the embodiments of the present disclosure to the manner disclosed herein. Although a plurality of example aspects and embodiments have been discussed above, those skilled in the art will recognize that certain variations, modifications, changes, additions, and sub-combinations thereof.

What is claimed is:

1. An instruction execution method, comprising:
acquiring an exceptional signal generated by a neural network processor during an operation by means of detecting multiple types of errors encountered by the neural network processor through multiple types of error detectors inside the neural network processor;

according to the exceptional signal, determining an exception processing instruction corresponding to the exceptional signal;

determining a first instruction queue to be executed by the neural network processor;

generating a second instruction queue according to the exception processing instruction and the first instruction queue; and executing the second instruction queue, wherein generating the second instruction queue according to the exception processing instruction and the first instruction queue comprises:

determining processing priority corresponding to the exception processing instruction, according to the exception processing instruction; and according to the processing priority, inserting the exception processing instruction into the first instruction queue to generate the second instruction queue.

2. The method of claim 1, wherein determining the exception processing instruction corresponding to the exceptional signal according to the exceptional signal comprises:

obtaining first identification information corresponding to an exceptional hardware module, from the exceptional signal;

obtaining the hardware module corresponding to the first identification information from the neural network processor;

obtaining second identification information for indicating that the hardware module is exceptional, from the exceptional signal;

determining an exception type corresponding to the second identification information; and according to the exceptional hardware module and the exception type, determining the exception processing instruction corresponding to the exceptional signal.

3. The method of claim 1, wherein, determining the first instruction queue to be executed by the neural network processor comprises:

obtaining the first instruction queue to be executed by the neural network processor from an instruction queue buffer in the neural network processor, wherein the first instruction queue comprises a plurality of instructions that are executed sequentially.

4. The method of claim 1, wherein the neural network processor further comprises a first instruction memory, and obtaining the first instruction queue to be executed by the neural network processor from the instruction queue buffer in the neural network processor comprises:

sequentially obtaining instruction storage addresses of the plurality of instructions to be executed by the neural network processor, in the first instruction memory;

sequentially storing the instruction storage addresses into the instruction queue buffer; and numbering the instruction storage addresses sequentially stored to generate the first instruction queue.

5. The method of claim 4, wherein the neural network processor further comprises a second instruction memory, on which a plurality of exception processing instructions are stored, and inserting the exception processing instruction into the first instruction queue according to the processing priority to generate the second instruction queue comprises:

determining a storage address of the exception processing instruction in the second instruction memory;

storing the storage address of the exception processing instruction in the instruction queue buffer; and according to the processing priority corresponding to the exception processing instruction and processing priority of original instructions in the instruction queue buffer, renumbering the storage address in the instruction queue buffer to generate the second instruction queue.

6. An electronic equipment, comprising:

a processor; and a memory configured to store instructions executable by the processor, wherein the processor is configured to read the instructions from the memory and execute the instructions to implement an instruction execution method, comprising:

acquiring an exceptional signal generated by a neural network processor during an operation by means of detecting multiple types of errors encountered by the neural network processor through multiple types of error detectors inside the neural network processor, according to the exceptional signal, determining an exception processing instruction corresponding to the exceptional signal, determining a first instruction queue to be executed by the neural network processor, generating a second instruction queue according to the exception processing instruction and the first instruction queue, and executing the second instruction queue, wherein generating the second instruction queue according to the exception processing instruction and the first instruction queue comprises:

determining processing priority corresponding to the exception processing instruction, according to the exception processing instruction; and according to the processing priority, inserting the exception processing instruction into the first instruction queue to generate the second instruction queue.

7. The electronic equipment of claim 6, wherein determining the exception processing instruction corresponding to the exceptional signal according to the exceptional signal comprises:

obtaining first identification information corresponding to an exceptional hardware module, from the exceptional signal;

obtaining the hardware module corresponding to the first identification information from the neural network processor;

obtaining second identification information for indicating that the hardware module is exceptional, from the exceptional signal;

determining an exception type corresponding to the second identification information; and according to the exceptional hardware module and the exception type, determining the exception processing instruction corresponding to the exceptional signal.

8. The electronic equipment of claim 6, wherein, determining the first instruction queue to be executed by the neural network processor comprises:

obtaining the first instruction queue to be executed by the neural network processor from an instruction queue buffer in the neural network processor, wherein the first instruction queue comprises a plurality of instructions that are executed sequentially.

9. The electronic equipment of claim 6, wherein the neural network processor further comprises a first instruction memory, and obtaining the first instruction queue to be executed by the neural network processor from the instruction queue buffer in the neural network processor comprises:
sequentially obtaining instruction storage addresses of the plurality of instructions to be executed by the neural network processor, in the first instruction memory;
sequentially storing the instruction storage addresses into the instruction queue buffer; and
numbering the instruction storage addresses sequentially stored to generate the first instruction queue.

10. The electronic equipment of claim 9, wherein the neural network processor further comprises a second instruction memory, on which a plurality of exception processing instructions are stored;
inserting the exception processing instruction into the first instruction queue according to the processing priority to generate the second instruction queue comprises:
determining a storage address of the exception processing instruction in the second instruction memory;
storing the storage address of the exception processing instruction in the instruction queue buffer; and
according to the processing priority corresponding to the exception processing instruction and processing priority of original instructions in the instruction queue buffer, renumbering the storage address in the instruction queue buffer to generate the second instruction queue.

11. A non-transitory computer-readable storage medium storing a computer program for executing an instruction execution method comprising:
acquiring an exceptional signal generated by a neural network processor during an operation by means of detecting multiple types of errors encountered by the neural network processor through multiple types of error detectors inside the neural network processor;
according to the exceptional signal, determining an exception processing instruction corresponding to the exceptional signal;
determining a first instruction queue to be executed by the neural network processor;
generating a second instruction queue according to the exception processing instruction and the first instruction queue; and
executing the second instruction queue,
wherein generating the second instruction queue according to the exception processing instruction and the first instruction queue comprises:
determining processing priority corresponding to the exception processing instruction, according to the exception processing instruction; and
according to the processing priority, inserting the exception processing instruction into the first instruction queue to generate the second instruction queue.

12. The computer-readable storage medium of claim 11, wherein determining the exception processing instruction corresponding to the exceptional signal according to the exceptional signal comprises:
obtaining first identification information corresponding to an exceptional hardware module, from the exceptional signal;
obtaining the hardware module corresponding to the first identification information from the neural network processor;
obtaining second identification information for indicating that the hardware module is exceptional, from the exceptional signal;
determining an exception type corresponding to the second identification information; and
according to the exceptional hardware module and the exception type, determining the exception processing instruction corresponding to the exceptional signal.

13. The computer-readable storage medium of claim 11, wherein, determining the first instruction queue to be executed by the neural network processor comprises:
obtaining the first instruction queue to be executed by the neural network processor from an instruction queue buffer in the neural network processor,
wherein the first instruction queue comprises a plurality of instructions that are executed sequentially.

14. The computer-readable storage medium of claim 11, wherein the neural network processor further comprises a first instruction memory, and obtaining the first instruction queue to be executed by the neural network processor from the instruction queue buffer in the neural network processor comprises:
sequentially obtaining instruction storage addresses of the plurality of instructions to be executed by the neural network processor, in the first instruction memory;
sequentially storing the instruction storage addresses into the instruction queue buffer; and
numbering the instruction storage addresses sequentially stored to generate the first instruction queue.

15. The computer-readable storage medium of claim 14, wherein the neural network processor further comprises a second instruction memory, on which a plurality of exception processing instructions are stored;
inserting the exception processing instruction into the first instruction queue according to the processing priority to generate the second instruction queue comprises:
determining a storage address of the exception processing instruction in the second instruction memory;
storing the storage address of the exception processing instruction in the instruction queue buffer; and
according to the processing priority corresponding to the exception processing instruction and processing priority of original instructions in the instruction queue buffer, renumbering the storage address in the instruction queue buffer to generate the second instruction queue.

* * * * *